United States Patent
Ishizu et al.

(10) Patent No.: US 7,895,764 B2
(45) Date of Patent: Mar. 1, 2011

(54) MEASURING INSTRUMENT

(75) Inventors: Kazuhiro Ishizu, Kawasaki (JP); Takeshi Yamamoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 94 days.

(21) Appl. No.: 12/379,795

(22) Filed: Mar. 2, 2009

(65) Prior Publication Data

US 2009/0229138 A1 Sep. 17, 2009

(30) Foreign Application Priority Data

Mar. 11, 2008 (JP) .............................. 2008-060695

(51) Int. Cl.
*G01B 5/004* (2006.01)
(52) U.S. Cl. ....................................................... 33/557
(58) Field of Classification Search .................. 33/557, 33/560
See application file for complete search history.

(56) References Cited

U.S. PATENT DOCUMENTS

| | | | | |
|---|---|---|---|---|
| 3,670,421 A | * | 6/1972 | Kiewicz et al. ............... | 33/560 |
| 4,776,103 A | * | 10/1988 | Cote ........................... | 33/557 |
| 4,908,951 A | | 3/1990 | Gurny | |
| 5,028,901 A | | 7/1991 | Enderle et al. | |
| 6,065,220 A | * | 5/2000 | Ohtsuka et al. ............... | 33/557 |
| 6,173,504 B1 | | 1/2001 | Ohtsuka et al. | |
| 7,024,273 B2 | * | 4/2006 | Tsuboi et al. ................. | 33/560 |
| 7,386,408 B2 | * | 6/2008 | Nishibashi et al. ............ | 33/557 |

FOREIGN PATENT DOCUMENTS

| | | |
|---|---|---|
| DE | 10 2007 019 453 A1 | 10/2008 |
| JP | A-11-142141 | 5/1999 |
| JP | A-2007-271358 | 10/2007 |

OTHER PUBLICATIONS

Sep. 29, 2009 Search Report issued in European Application No. 09 15 4315.7.

* cited by examiner

*Primary Examiner*—G. Bradley Bennett
(74) *Attorney, Agent, or Firm*—Oliff & Berridge, PLC (57) ABSTRACT

A measuring instrument includes: an XY stage on which an object to be measured is placed; a probe holder having a plurality of probes; and a relative moving mechanism that relatively moves the XY stage and the probe holder. The probe holder is provided with a probe selection mechanism that has two guide rails obliquely arranged and advances and retracts at least two of the probes to be selectively positioned at and away from a probe selection position.

5 Claims, 8 Drawing Sheets

MEASURING INSTRUMENT

BACKGROUND OF THE INVENTION

1. Field of the Invention

The present invention relates to a measuring instrument. Specifically, it relates to a measuring instrument mounted with a plurality of probes.

2. Description of Related Art

When, for instance, a plurality of measuring portions on an object to be measured are measured using a single measuring instrument, the most appropriate probe is required to be used for measurement according to shapes of the measuring portions, measuring items, required measuring accuracy and the like. For this purpose, a measuring instrument provided with a so-called probe exchange function is also proposed, where a probe stocker storing a plurality of probes is provided and an appropriate probe for the measurement is selected to be exchanged.

However, in order to exchange the probes, the probe holder has to be moved to the position of the probe and, subsequently, the probes have to be exchanged between the probe holder and the probe stocker, which takes considerable time.

Accordingly, a measuring instrument mounted with a plurality of probes in advance in a probe holder is also proposed (see, for instance, Document 1: JP-A-11-142141).

Figure 7:
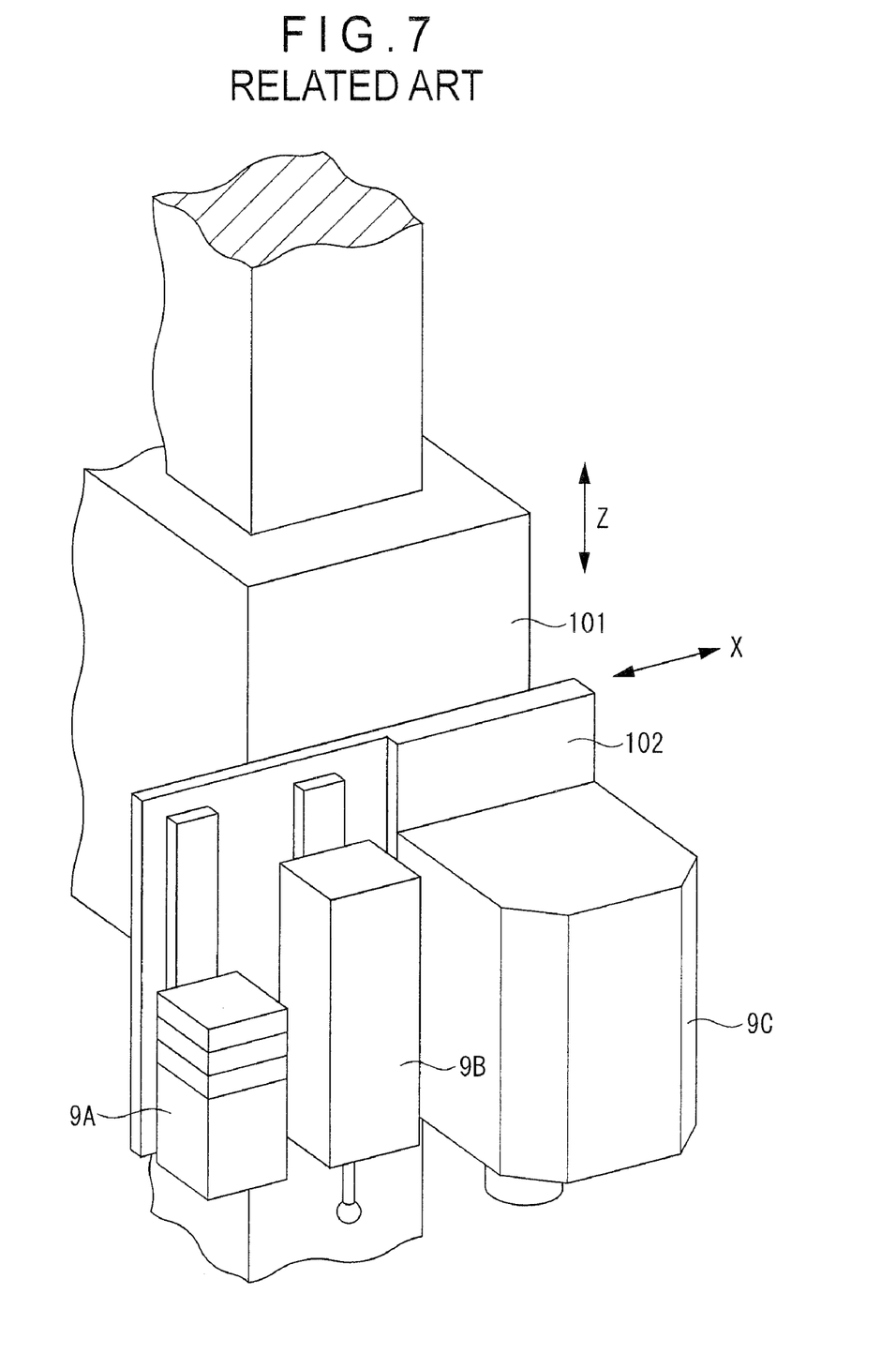
FIG. 7 is a perspective view showing an exemplary arrangement a plurality of probes in a conventional surface texture measuring instrument.
Figure 8:
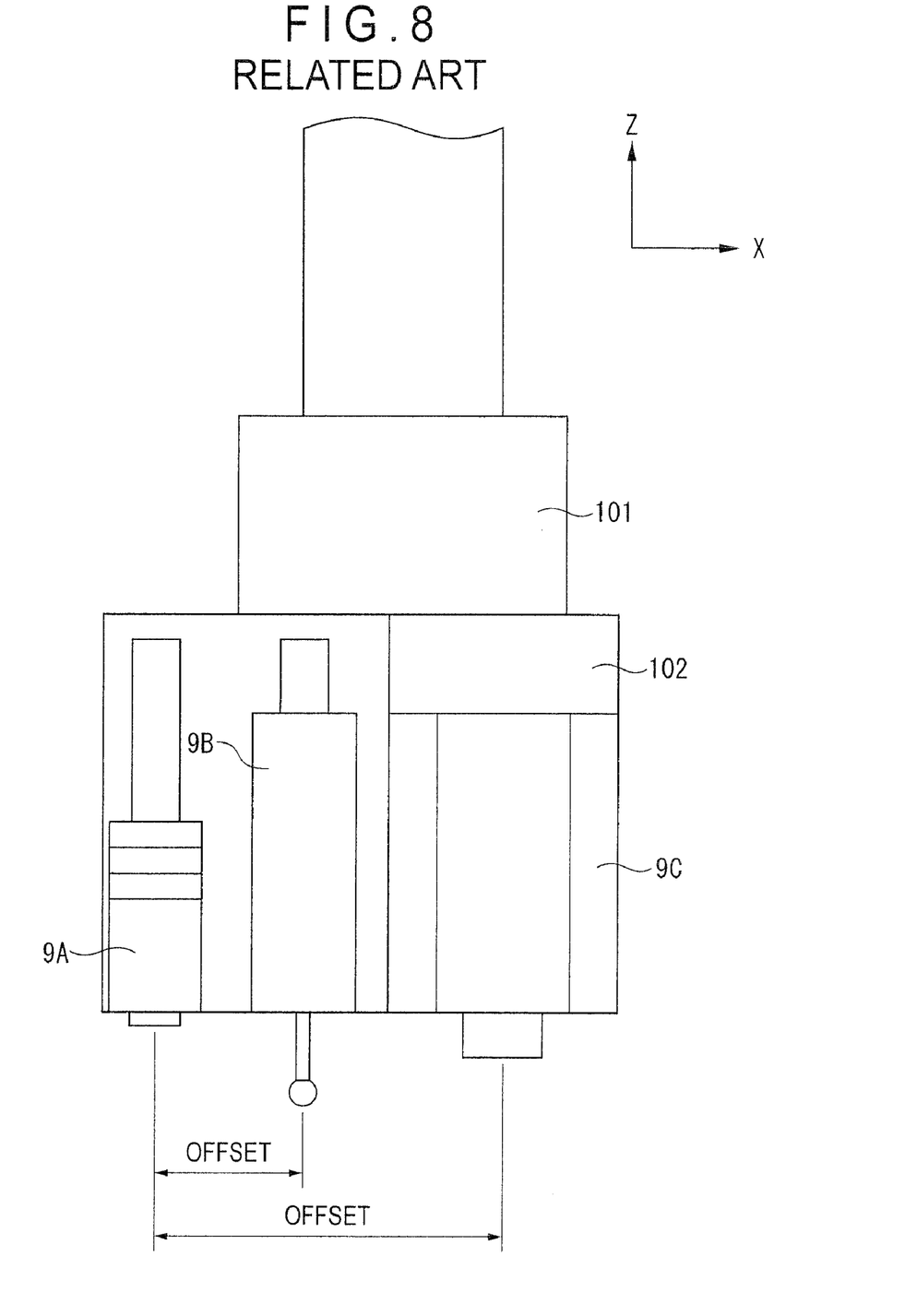
FIG. 8 is a front view of FIG. 7.

Conventionally, when a plurality of probes are mounted on a probe holder, e.g. when, as shown in FIGS. 7 and 8, three probes of a laser displacement probe 9A, a touch signal probe 9B and an image probe 9C are mounted on a probe holder 102 provided on a Z-axis slider 101 of a coordinate measuring machine, three probes are juxtaposed with a predetermined interval in a direction (e.g. X-axis direction) perpendicular to a movable direction (e.g. Z-axis direction) of the probe holder 102.

However, juxtaposition of the three probes (the laser displacement probe 9A, the touch signal probe 9B and the image probe 9C) results in offset of the probes 9A, 9B and 9C in the X-axis direction, which will lead to narrowing measurable ranges in common with the probes and increasing Abbe's error by the offset in the X-axis direction.

Moreover, when relative moving ranges between the object to be measured and the probes 9A, 9B and 9C are expanded so as to broaden the measurable ranges, the size of the instrument is increased.

SUMMARY OF THE INVENTION

An object of the invention is to provide a measuring instrument for maintaining the measurable ranges in common with the probes without increasing the size of the instrument by solving the forgoing disadvantages.

A measuring instrument according to an aspect of the invention includes: a table on which an object to be measured is placed; a probe holder having a plurality of probes; and a relative moving mechanism that relatively moves the table and the probe holder, in which the probe holder is provided with a probe selection mechanism that advances and retracts at least two of the probes to be selectively positioned at and away from a probe selection position.

According to such an arrangement, the probe selection mechanism can position one of the probes at the probe selection position of the probe holder and separate other probe(s) from the probe selection position of the probe holder.

Accordingly, by positioning the probe to be used at the probe selection position of the probe holder, the probe to be used during a measurement step stays at the same position, so that the measurable ranges in common with the probes can be maintained without increasing the size of the instrument.

In the measuring instrument according to the above aspect of the invention, it is preferable that the probe selection mechanism is provided with a plurality of guide rails having first ends that are arranged in the proximity of the probe selection position and second ends that extend away from the probe selection position in a manner to be separated from each other and the probes are advanced and retracted along the guide rails.

According to such an arrangement, respective probes are advanced and retracted while being guided by and along a plurality of guide rails having the first ends that are arranged in the proximity of the probe selection position and the second ends that extend away from the probe selection position in a manner to be separated from each other, so that respective probes can be positioned precisely at the probe selection position and can be advanced and retracted in a stable posture.

In the measuring instrument according to the above aspect of the invention, it is preferable that the probe holder has support faces surrounding the probe selection position and being formed perpendicularly to each other and the probe selection mechanism is mounted on the support faces and provided with the guide rails that include two guide rails having the first ends that are arranged in the proximity of the probe selection position and the second ends that extend away from the probe selection position in a manner to be separated from each other.

According to such an arrangement, respective probes are advanced and retracted obliquely along the guide rails, so that a plurality of probes can be advanced and retracted without interference to each other within a relatively narrow space.

In the measuring instrument according to the above aspect of the invention, it is preferable that the probe selection position is set in the proximity of a movable axis line of the probe holder.

According to such an arrangement, the probe selection position is set in the proximity of a movable axis line of the probe holder, so that Abbe's error can be lowered to a minimum.

In the measuring instrument according to the above aspect of the invention, it is preferable that the probes include at least two probes selected from a laser displacement probe, a touch signal probe and an image probe.

According to such an arrangement, a highly accurate and efficient measurement of the measuring portions of the object to be measured can be achieved by the selective use of the probes according to shapes of the measuring portions of the object to be measured and the measuring items.

DETAILED DESCRIPTION OF PREFERRED EMBODIMENT(S)

Figure 1:
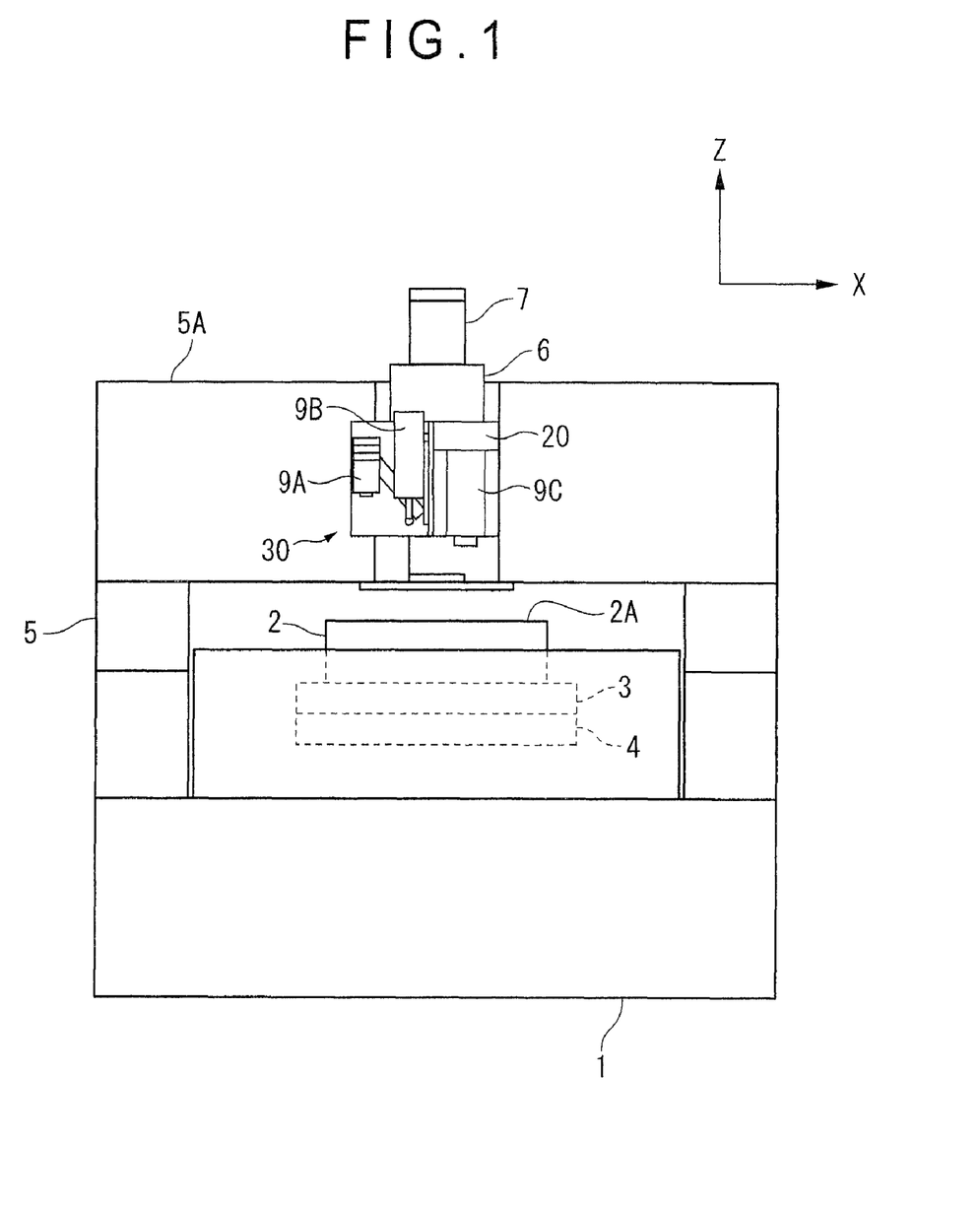
FIG. 1 is a front view of an exemplary embodiment of a surface texture measuring instrument of the invention.
Figure 2:
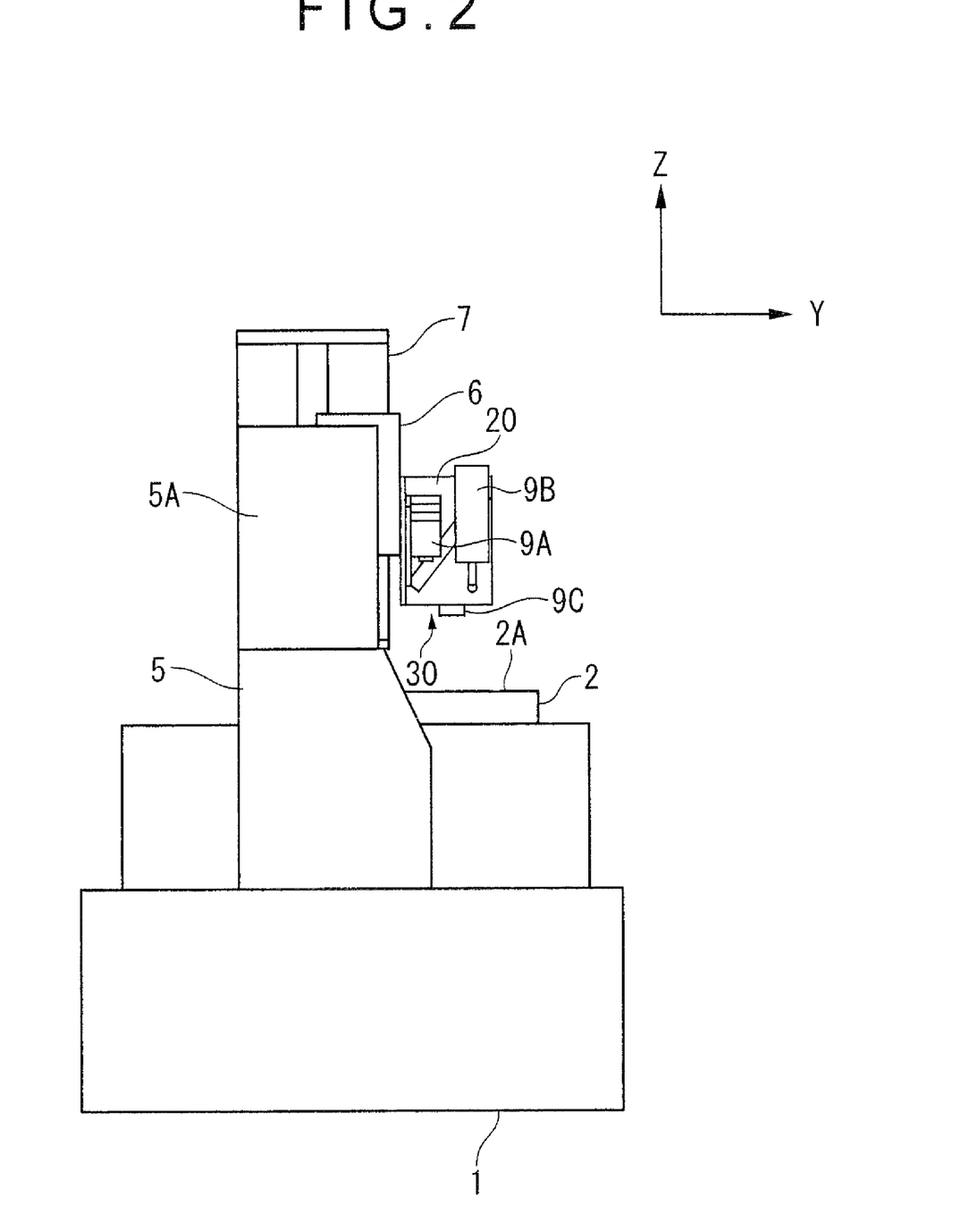
FIG. 2 is a side view of the above embodiment.

Explanation of Overall Structure (see FIGS. 1 and 2)

FIG. 1 is a front view of an exemplary embodiment of a surface texture measuring instrument of the invention and FIG. 2 shows a side view of the same.

A surface texture measuring instrument of an embodiment of the invention includes: a base 1; an XY stage 2 as a table for placing an object to be measured; an X-axis driving mechanism 3 and a Y-axis driving mechanism 4 for displacing the XY stage 2 in X-axis and Y-axis directions which are perpendicular to each other in a horizontal plane; a portal frame 5 provided on an upper side of the base 1; a Z-axis slider 6 mounted on a cross rail 5A of the portal frame 5; a Z-axis driving mechanism 7 for displacing the Z-axis slider 6 in a Z-axis direction perpendicular to X-axis and Y-axis directions; a probe holder 20 attached to the Z-axis slider 6; and three different probes 9A, 9B and 9C provided to the probe holder 20 through a probe selection mechanism 30.

The XY stage 2 has a flat stage surface 2A on which the Object to be measured is placed and can be moved in the X-axis and Y-axis directions perpendicular to each other in a plane parallel to the stage surface 2A.

The X-axis driving mechanism 3 and the Y-axis driving mechanism 4 are provided, for instance, by a feed screw mechanism having a ball screw axis and a nut member screwed onto the ball screw axis.

Similarly to the X-axis driving mechanism 3 and the Y-axis driving mechanism 4, the Z-axis driving mechanism 7 is also provided, for instance, by a feed screw mechanism having a ball screw axis and a nut member screwed onto the ball screw axis.

In other words, the XY stage 2 and the probe holder 20 can be relatively moved in three-dimensional directions by a relative moving mechanism including the X-axis driving mechanism 3, the Y-axis driving mechanism 4 and the Z-axis driving mechanism 7.

Figure 3:
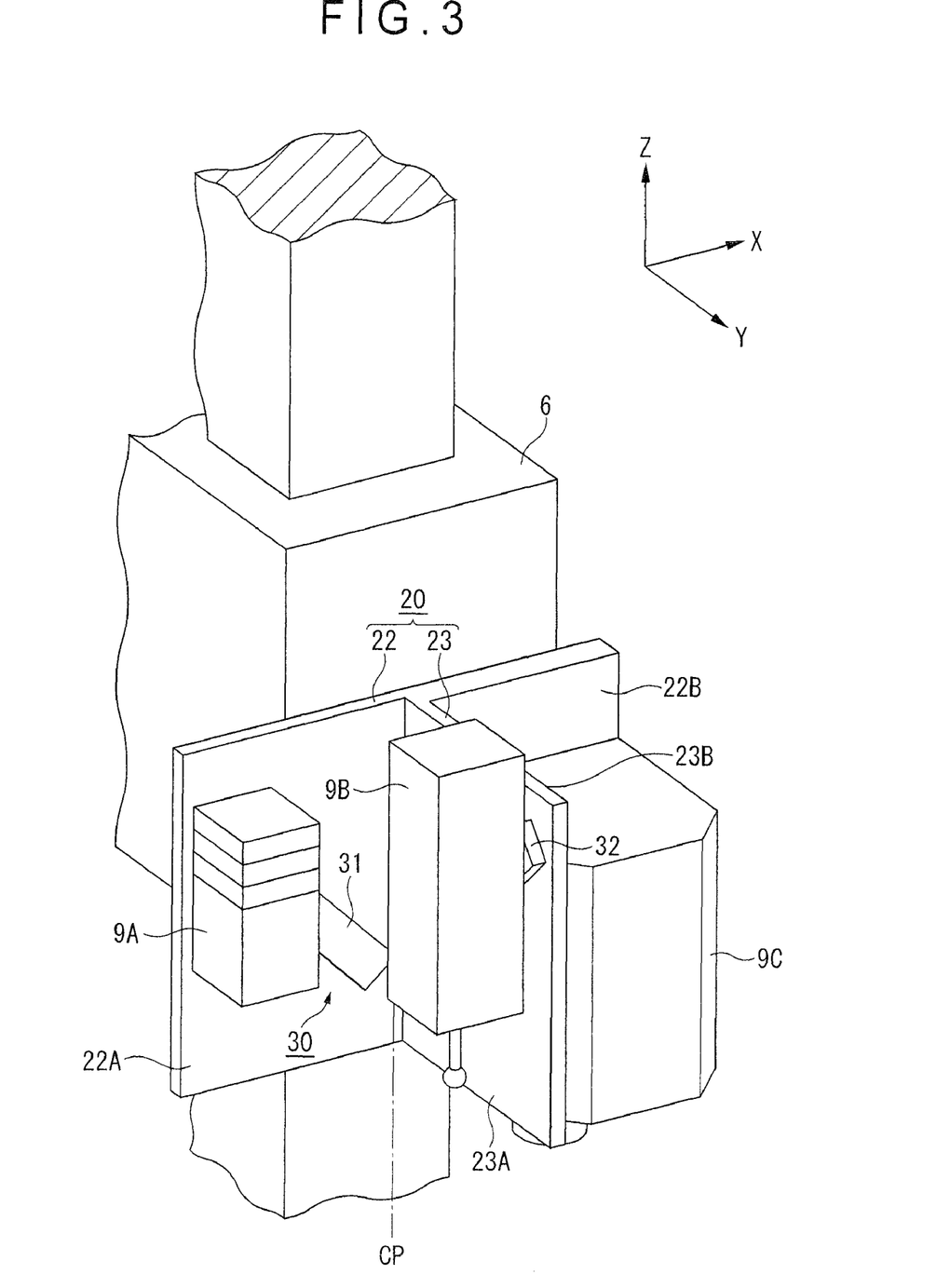
FIG. 3 is an enlarged perspective view of a probe holder in the above embodiment.

Explanation of Probe Holder and Probe Selection Mechanism (see FIG. 3)

The probe holder 20 has a base plate 22 mounted on the Z-axis slider 6 and parallel to an XZ plane and a riser plate 23 disposed substantially at the center of the base plate 22 to extend perpendicularly to the Y direction, thereby forming a T-shape in plan view.

Between the left half of the base plate 22 and the riser plate 23, a first support face 22A and a second support face 23A are formed perpendicularly to each other in the proximity of a movable axis line of the probe holder 20 (a movable axis line in a Z direction of the Z-axis slider 6) surrounding a probe selection position CP previously determined in order to locate the probe selected at the time of measurement. On the first support face 22A and the second support face 23A, the probes 9A and 9B are mounted through the probe selection mechanism 30.

Between the right half of the base plate 22 and the riser plate 23, a third support face 22B and a fourth support face 23B are formed perpendicularly to each other. The probe 9C is fixed on the third support face 22B and the fourth support face 23B.

The probe selection mechanism 30 advances and retracts the two probes 9A and 9B to be selectively positioned at and away from the probe selection position CP. The probe selection mechanism 30 includes two guide rails 31 and 32 arranged on the first support face 22A and the second support face 23A, and a driving mechanism (not shown) for advancing and retracting the probes 9A and 9B along the guide rails 31 and 32.

The guide rails 31 and 32 are obliquely arranged with the first ends that are arranged in the proximity of the probe selection position CP and the second ends that extend away from the probe selection position CP in a manner to be separated from each other. Any driving mechanisms that can advance and retract the probes 9A and 9B along the guide rails 31 and 32 while maintaining the postures thereof are applicable as the driving mechanism of the probe selection mechanism. For example, a feed screw mechanism, rolling contact driving mechanism and a linear motor may be used.

Explanation of Probes

The probes 9A, 9B and 9C include a laser displacement probe 9A, a touch signal probe 9B and an image probe 9C.

The laser displacement probe 9A includes, for instance, a laser irradiator for irradiating laser obliquely to an object to be measured and a laser displacement gauge provided with a photodetector for receiving reflected light from the object to be measured. An output signal from the photodetector is received by a processing unit, where a height of the object to be measured is calculated based on the output signal from the photodetector.

The touch signal probe 9B to be used, for instance, electrically detects displacement and flexure of a stylus when the stylus contacts the object to be measured to detect the contact position of the stylus, or detects damped vibration when a vibrating stylus contacts the object to be measured to detect the contact position of the stylus.

The image probe 9C is, for instance, a CCD camera, but not limited to this. Any probes capable of taking an image of the object to be measured may be used.

Figure 4:
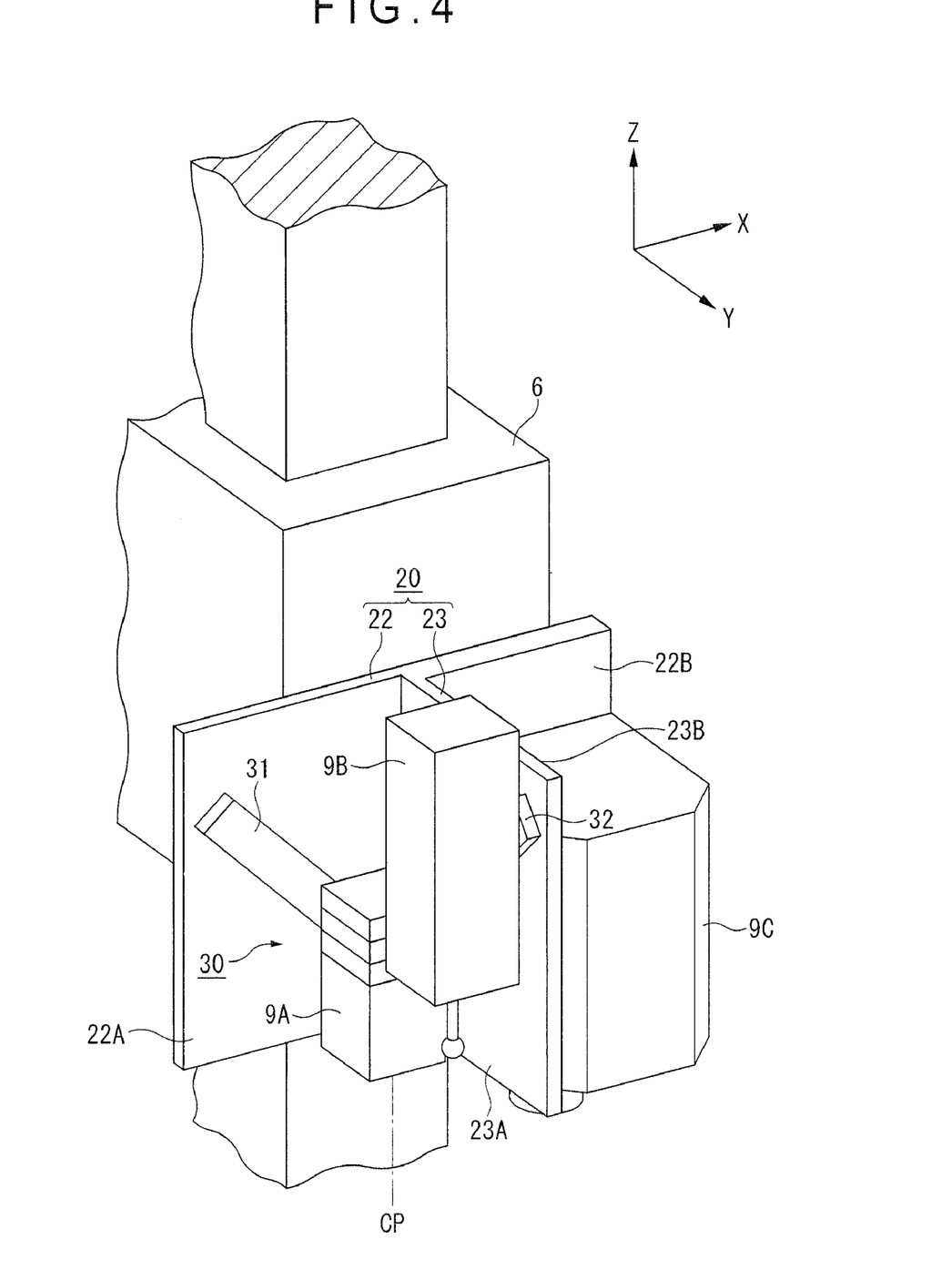
FIG. 4 is a perspective view showing a selection operation of probes in the above embodiment.

Explanation of Measuring Operation (see FIG. 4)

In measuring an object to be used, a probe to be used is initially selected.

For example, when the image probe 9C is selected, the X-axis driving mechanism 3 and the Y-axis driving mechanism 4 are driven so as to locate the measuring portion of the object to be measured right under the image probe 9C. Subsequently, while displacing the XY stage 2 in X-axis and Y-axis directions, image of the object is measured.

When either one of the laser displacement probe 9A and the touch signal probe 9B is selected, the selected probe is initially located at the probe selection position CP. For example, when the laser displacement probe 9A is selected, the laser displacement probe 9A is moved toward the probe selection position CP to be located at the probe selection position CP as shown in FIG. 4. In this case, since the touch signal probe 9B has been retracted from the probe selection position CP, interference between the laser displacement probe 9A and the touch signal probe 9B can be avoided.

Under this condition, the X-axis driving mechanism 3 and the Y-axis driving mechanism 4 are driven to displace the XY stage 2 in X-axis and Y-axis directions, while measuring a height of the object.

When the touch signal probe 9B is selected, the laser displacement probe 9A is retracted from the probe selection position CP. Then, the touch signal probe 9B is moved toward the probe selection position CP to be located thereat.

Under this condition, the X-axis driving mechanism 3 and the Y-axis driving mechanism 4 are driven. Then, the XY stage 2 is displaced in X-axis and Y-axis directions, while measuring a shape of the object.

Advantage of Embodiment

According to the above embodiment, with the use of the probe selection mechanism 30, either one of the laser displacement probe 9A and the touch signal probe 9B can be positioned at the probe selection position CP and the other can be retracted from the probe selection position CP.

Accordingly, by positioning a probe to be used at the probe selection position CP, the probe to be used during a measurement step stays at the same position, so that the measurable ranges in common with the probes can be maintained without increasing the size of the instrument.

Further, the probe selection mechanism 30 includes a plurality of guide rails 31 and 32 having the first ends that are arranged in the proximity of the probe selection position CP and the second ends that extend away from the probe selection position CP in a manner to be separated from each other, and the probes 9A and 9B are adapted to be advanced and retracted along the respective guide rails 31 and 32. To sum up the above, the probes 9A and 9B are advanced and retracted while being guided by and along the guide rails 31 and 32. Therefore, the probes 9A and 9B can be positioned precisely at the probe selection position CP and can be advanced and retracted in a stable posture by the probe selection mechanism 30.

Additionally, the guide rails 31 and 32 are arranged on the first support face 22A and the second support face 23A of the base plate 22 and the riser plate 23 which are perpendicular to each other in a manner to be separated from each other, where the guide rails 31 and 32 have the first ends that are arranged in the proximity of the probe selection position CP and the second ends that extend away from the probe selection position CP. To sum up the above, the probes 9A and 9B are advanced and retracted obliquely along the guide rails 31 and 32. Therefore, the probes 9A and 9B can be advanced and retracted further without interference to each other within a relatively narrow space by the guide rails 31 and 32.

Moreover, since the probe selection position CP is set in the proximity of the movable axis line of the probe holder 20, i.e. the movable axis line (an axis line in Z-direction) of the Z-axis slider 6, Abbe's error can be lowered to a minimum.

Further, since the probes are provided with the laser displacement probe 9A, the touch signal probe 9B and the image probe 9C, a highly accurate and efficient measurement of the measuring portions can be achieved by the selective use of the probes according to shapes of the measuring portions of the object to be measured and the measuring items.

Modifications

The invention is not limited to the forgoing exemplary embodiment, but includes modifications, improvements and the like within the range in which an object of the invention can be achieved.

Figure 5:
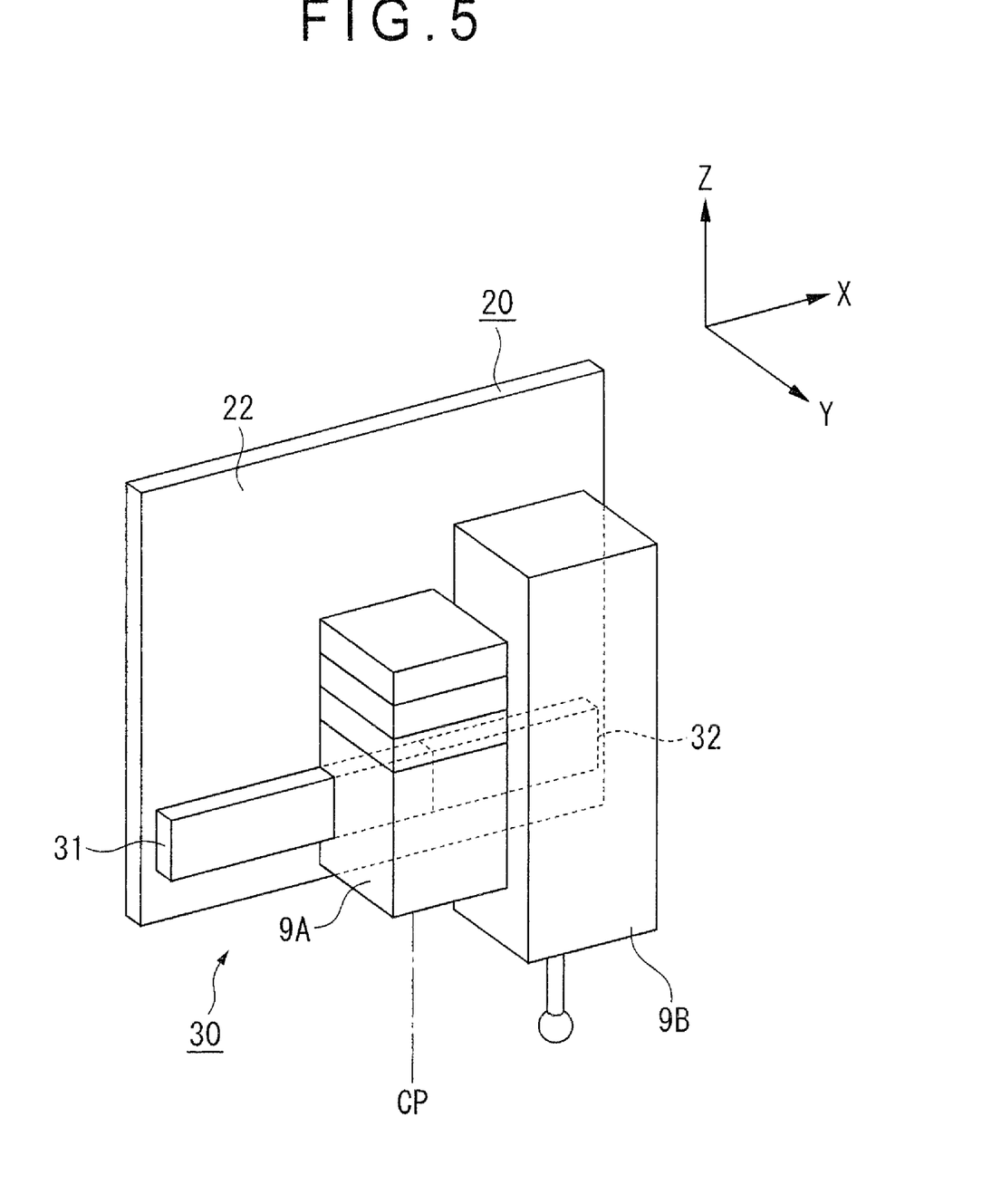
FIG. 5 is a perspective view showing a modification of a probe selection mechanism of the invention.

In the embodiment described above, the laser displacement probe 9A and the touch signal probe 9B are advanced and retracted obliquely by the probe selection mechanism 30, but the laser displacement probe and the touch signal probe may be arranged differently. For example, as shown FIG. 5, two guide rails 31 and 32 may be linearly arranged along the X-axis direction on the base plate 22 of the probe holder 20 and the probes 9A and 9B may be advanced and retracted in the X direction along the guide rails 31 and 32. In this case, the guide rails 31 and 32 may be replaced with a single guide rail.

Figure 6:
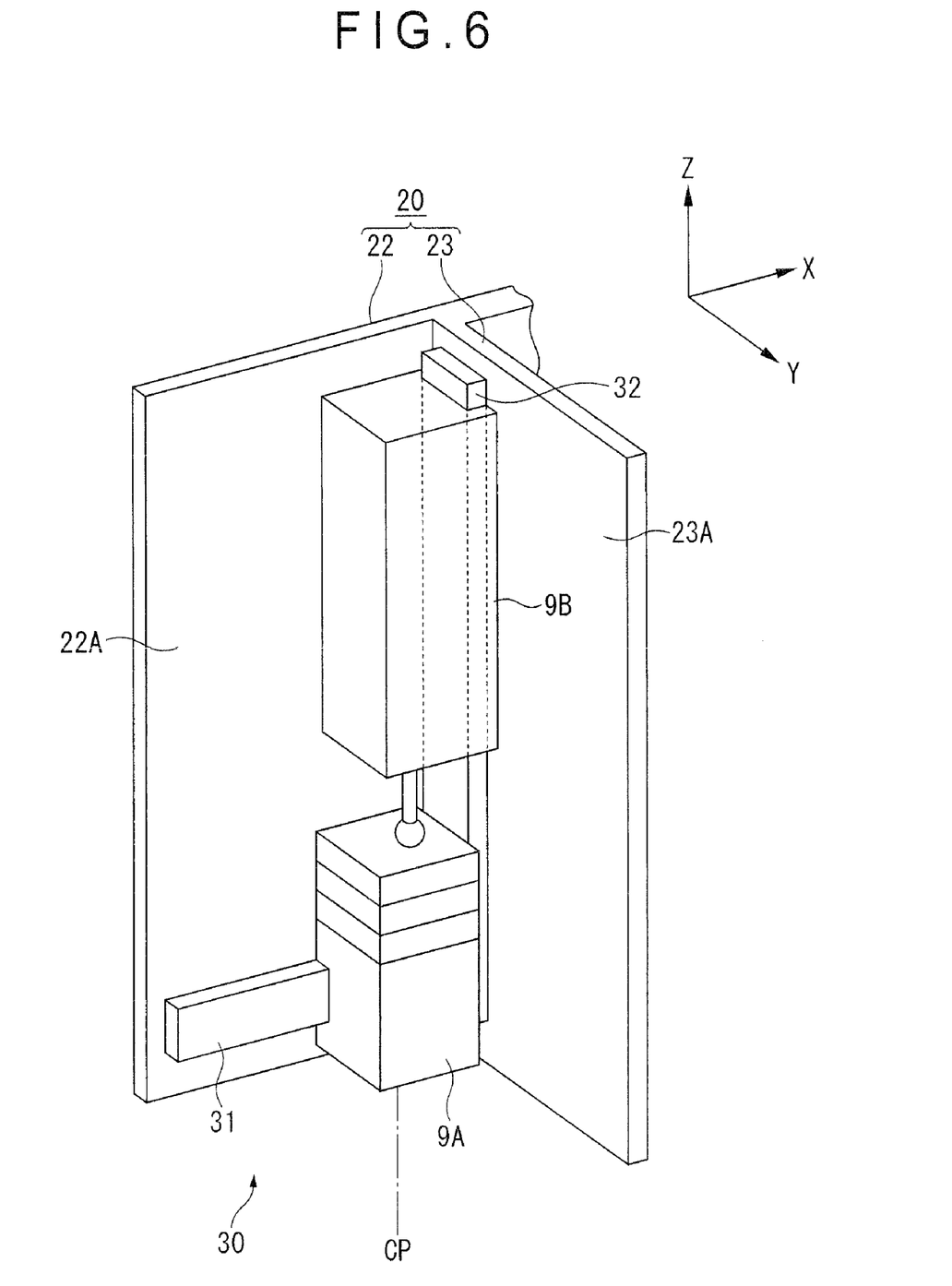
FIG. 6 is a perspective view showing another modification of the probe selection mechanism of the invention.

Alternatively, as shown in FIG. 6, the guide rail 31 may be linearly arranged along the X-axis direction on the first support face 22A of the base plate 22 whereas the guide rail 32 may be linearly arranged along the Z-axis direction on the second support face 23A of the base plate 22. The probes 9A and 9B may be advanced and retracted along the guide rails 31 and 32. In other words, even if the probes 9A and 9B are adapted to be advanced and retracted in X-axis and Z-axis directions which are perpendicular to each other, the same advantage can be obtained as the embodiment described above.

In the embodiment described above, the XY stage 2 can be moved in the X and Y directions and the probe holder 20 with the probes 9A, 9B and 9C can be moved in Z-axis direction, but the XY stage 2 and the probe holder 20 may be arranged differently. For example, the stage 2 may be moved in Y-axis direction and the probe holder 20 may be moved in Y-axis and Z-axis directions. As long as the stage 2 and the probe holder 20 can be relatively moved, the movements of the stage 2 and the probe holder 20 are not limitative.

In the embodiment described above, the measuring instrument is exemplarily provided with the three probes, i.e. the laser displacement probe 9A, the touch signal probe 9B and the image probe 9C, but other probes may be used. For example, a surface roughness probe may be provided.

The entire disclosure of Japanese Patent Application No. 2008-060695, filed Mar. 11, 2008, is expressly incorporated by reference herein.

What is claimed is:

1. A measuring instrument, comprising:
a table on which an object to be measured is placed;
a probe holder having a plurality of probes; and
a relative moving mechanism that relatively moves the table and the probe holder,
wherein the probe holder is provided with a probe selection mechanism that advances and retracts at least two of the probes to be selectively positioned at and away from a probe selection position,
the probe holder has support faces surrounding the probe selection position and being formed perpendicularly to each other, and
the probe selection mechanism is mounted on the support faces and is provided with two guide rails having first ends that are arranged in the proximity of the probe selection position and second ends that extend away from the probe selection position in a manner to be separated from each other.

2. The measuring instrument according to claim 1, wherein the probe selection position is set in the proximity of a movable axis line of the probe holder.

3. The measuring instrument according to claim 1, wherein the probes include at least two probes selected from a laser displacement probe, a touch signal probe and an image probe.

4. The measuring instrument according to claim 1, wherein the support faces include a first support face and a second support face and the two guide rails are respectfully disposed on the first support face and the second support face such that the two guide rails extend along planes perpendicular to each other.

5. The measuring instrument according to claim 1, wherein a distance between the first ends of the two guide rails is less than a distance between the second ends of the two guide rails.

* * * * *